No. 704,481. Patented July 8, 1902.
F. E. LIBENOW.
WASHPAIL.
(Application filed Mar. 26, 1901.)
(No Model.)
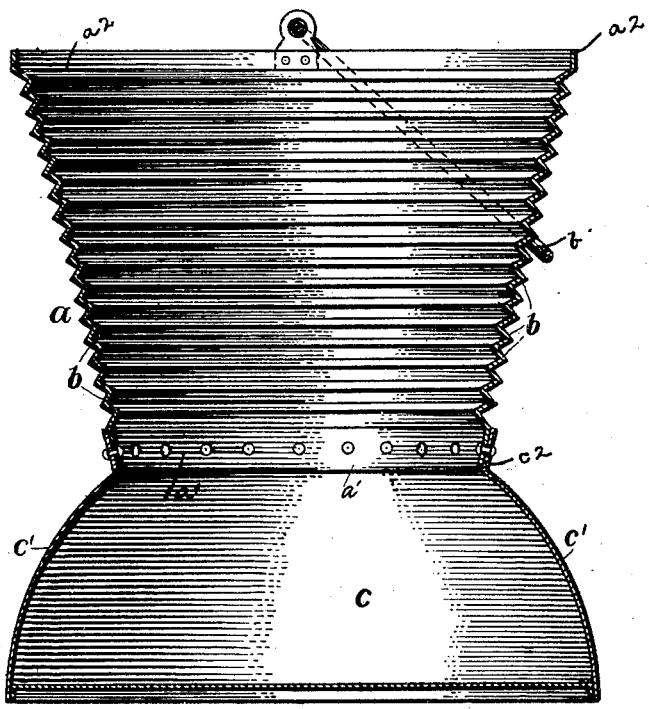
WITNESSES:
INVENTOR
Ferdinand E. Libenow.
BY
Fred G. Dieterich
ATTORNEY

UNITED STATES PATENT OFFICE.

FERDINAND EDWARD LIBENOW, OF NEW WESTMINSTER, CANADA, ASSIGNOR TO WASH-BOARD PAIL COMPANY, INCORPORATED, OF SPOKANE, WASHINGTON.

WASHPAIL.

SPECIFICATION forming part of Letters Patent No. 704,481, dated July 8, 1902.

Application filed March 26, 1901. Serial No. 52,933. (No model.)

*To all whom it may concern:*

Be it known that I, FERDINAND EDWARD LIBENOW, a citizen of the United States, residing at New Westminster, in the Province of British Columbia, Canada, have invented a new and useful Washpail, of which the following is a specification.

My invention seeks to provide a new and improved wash pail or bucket which will serve for the ordinary domestic purposes and which has a special construction whereby it will also serve as a simple, handy, and effective washboard, and in its generic nature it comprehends a bucket or pail of any suitable material, the walls of which are corrugated in horizontal planes to provide a washboard or rubbing surface, and said corrugations extending entirely around the bucket or pail body.

In its more complete nature my invention embodies a vessel having an upper horizontally-corrugated portion and a lower non-corrugated portion enlarged to form a bowl of greater diameter than the upper or corrugated portion to provide a bucket or pail having a washboard-surface at a point above a water-holding compartment, whereby a rubbing or washing operation can be effected without unnecessary splashing.

Again, my invention seeks to provide as a new article of manufacture a bucket or pail for ordinary domestic purposes having an upper downwardly-tapering portion corrugated horizontally and a lower non-corrugated portion, the upper part of which is of reduced diameter and joined with the bottom of the upper portion and bulged out from its point of connection to produce an enlarged water-holder. In its more specific nature my invention also includes certain details of construction hereinafter fully described and claimed.

In the drawing the figure is a vertical section of the preferred form of my bucket or pail.

In the preferred construction my bucket or pail comprises an upper corrugated portion $a$ and a lower non-corrugated part $c$, which on the score of economy in manufacture is made separate and secured water-tight to the part $a$ in any suitable manner, preferably by terminating its upper or throat portion with a flange $c^2$ to fit over a smooth extension or flange portion $a'$, that forms the lower edge of the upper part $a$. The two parts are riveted together, as shown. Both parts $a$ and $c$ may be made of any suitable material, preferably of sheet metal, bent up to shape by suitable forming and pressing mechanism, and the part $a$, in the preferred form, is made tapering like an ordinary bucket or pail, and is also formed by "crimping" with horizontal corrugations $b$ to produce a washboard or rubbing surface.

In the preferred form the corrugations are extended entirely around the body $a$ and extend from the upper smooth rim edge $a^2$ down to the smooth end $a'$.

B designates the bail or handle hinged to the top of the bucket, as usual.

By extending the corrugations entirely around admits of the part $a$ being made up of very thin metal, as the crimping or corrugating thereof stiffens the same.

To provide against splashing over the top of the bucket during rubbing on the sides of part $a$, I make the bottom $c$ of greater width than the lower end of part $a$ to produce, as it were, a reservoir, and the top part $c'$ of said reservoir is curved up toward the throat of end $a'$ of part $a$, so that water that splashes up will be deflected by the part $c'$ back into the center of the bucket and thrown back into the reservoir. Furthermore, by constructing the bucket with an enlarged reservoir said reservoir serves the double purpose, first, for holding a large quantity of water without interfering with or reducing the effectiveness of the washboard or rubbing surface, and, second, the enlarged base of the reservoir with the water in the reservoir serves to steady the pail under the effort of rubbing the clothes on the sides.

From the foregoing, taken in connection with the drawing, it is thought the advantages of my invention will be readily apparent.

Manifestly my bucket or pail forms a convenient washboard for washing out small articles of wearing-apparel, especially infants' clothing, and avoids the necessity of using a large wash tub and board and consequent large amount of hot water, and, furthermore, by reason of the enlarged reservoir or bottom part of the pail the same can be conveniently used as a boiler or steamer, dispensing thereby with the use of a separate boiler for heating the water or steaming the clothes.

Having thus described my invention, what I claim, and desire to be protected in by Letters Patent, is—

As a new article, a bucket, having its upper part made tapering and provided with internal horizontal rubbing-surfaces, its lower part being smooth and curved outward toward the base, to deflect the splashing water toward the center of the bucket, substantially as shown and for the purposes described.

FERDINAND EDWARD LIBENOW.

In presence of—
ROWLAND BRITTAIN,
ELLICE M. WEBBER.